United States Patent
Yamada (10) Patent No.: US 9,638,248 B2
(45) Date of Patent: May 2, 2017

(54) PLASTIC CAGE

(71) Applicant: NSK LTD., Tokyo (JP)

(72) Inventor: Ryosuke Yamada, Takasaki (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/101,664

(22) PCT Filed: Nov. 26, 2014

(86) PCT No.: PCT/JP2014/081290
§ 371 (c)(1),
(2) Date: Jun. 3, 2016

(87) PCT Pub. No.: WO2015/083595
PCT Pub. Date: Jun. 11, 2015

(65) Prior Publication Data
US 2016/0305482 A1 Oct. 20, 2016

(30) Foreign Application Priority Data

Dec. 5, 2013 (JP) ................................. 2013-252508

(51) Int. Cl.
*F16C 33/46* (2006.01)
*F16C 19/46* (2006.01)

(52) U.S. Cl.
CPC .......... *F16C 33/4635* (2013.01); *F16C 19/46* (2013.01); *F16C 33/4611* (2013.01); *F16C 33/4682* (2013.01)

(58) Field of Classification Search
CPC .. F16C 19/46; F16C 33/4611; F16C 33/4635; F16C 33/4682
See application file for complete search history.

(56) References Cited

U.S. PATENT DOCUMENTS 3,388,952 A * 6/1968 Schaeffler ........... F16C 33/4635
384/576
3,892,447 A * 7/1975 Gruber ................ B29C 45/2628
16/DIG. 27

(Continued)

FOREIGN PATENT DOCUMENTS

DE 3732404 A1 3/1988
FR 1457071 A * 10/1966 .......... F16C 33/4611

(Continued)

OTHER PUBLICATIONS

Int. Search Report dated Mar. 3, 2015 issued in Application No. PCT/JP2014/081290 (PCT/ISA/210).

(Continued)

*Primary Examiner* — Phillip A Johnson
(74) *Attorney, Agent, or Firm* — Sughrue Mion, PLLC (57) ABSTRACT

Pillar parts (10) are connected to the inner peripheral surface (5*b*) of a large-diameter rim part (5) and to the outer peripheral surface (7*b*) of a small-diameter rim part (7). The inner peripheral surface (5*b*) of the large-diameter rim part (5) and the outer peripheral surface (7*b*) of the small-diameter rim part (7) 5 respectively have axial-direction inside portions (5*c*), (7*c*) overlapping with the pillar parts (10) in the axial direction and axial-direction outside portions (5*d*), (7*d*) not overlapping with the pillar parts (10) in the axial direction. A small-diameter annular member (2) is internally fitted in the axial-direction outside portion (5*d*) of the inner peripheral 10 surface (5*b*) of the large-diameter rim part (5). A large-diameter annular member (4) is externally fitted in the axial-direction outside portion (7*d*) of the outer peripheral surface (7*b*) of the small-diameter rim part (7).

3 Claims, 8 Drawing Sheets

(56) References Cited

U.S. PATENT DOCUMENTS

| | | | |
|---|---|---|---|
| 4,934,841 A | | 6/1990 | De Vito |
| 2008/0019623 A1 | * | 1/2008 | Otsuka ................ F16C 33/3831 384/51 |

FOREIGN PATENT DOCUMENTS

| | | | | |
|---|---|---|---|---|
| GB | 1189213 A | * | 4/1970 | .......... F16C 33/4635 |
| JP | 48-13623 U | | 2/1973 | |
| JP | 51-59742 U | | 5/1976 | |
| JP | 60-8525 A | | 1/1985 | |
| JP | 62-117322 U | | 7/1987 | |
| JP | 2-89814 A | | 3/1990 | |
| JP | 2005-225032 A | | 8/2005 | |
| JP | 2008-19935 A | | 1/2008 | |
| JP | 2009-250409 A | | 10/2009 | |
| JP | 2012-167695 A | | 9/2012 | |

OTHER PUBLICATIONS

Written Opinion dated Mar. 3, 2015 issued in Application No. PCT/JP2014/081290 (PCT/ISA/237).

\* cited by examiner

PLASTIC CAGE

TECHNICAL FIELD

The invention relates to a plastic cage and, more specifically, to a plastic cage which is injection molded by an axial draw mold.

BACKGROUND ART

Conventionally, as a plastic cage for a radial bearing used in the change gear support part or shaft support part of an automobile transmission, there is known a cage which is injection molded by a radial draw mold (which is hereinafter called also a radial draw cage. See, for example, the patent document 1.), or a cage which is injection molded by an axial draw mold (which is hereinafter called also an axial draw cage. See, for example, the patent document 2~4.).

Figure 4:
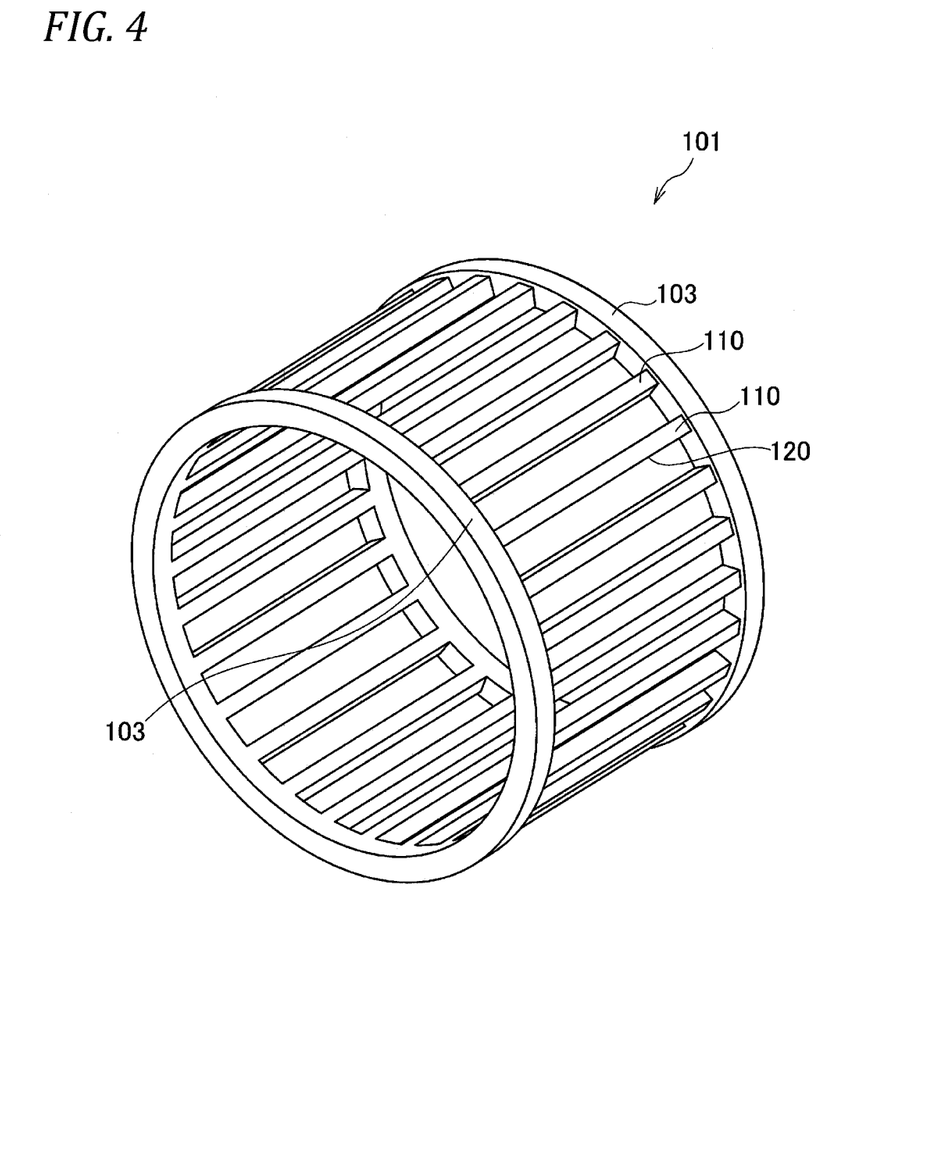
FIG. 4 is a perspective view of a conventional radial draw cage.

As shown in FIG. 4, a cage 101 molded according to a radial draw system includes a pair of annular rim parts 103 spaced axially from each other and arranged coaxially, multiple pillar parts 110 connecting together the paired rim parts 103 in the axial direction and arranged at specific intervals in the circumferential direction, and pocket parts 120 each defined by the paired rim parts 103 and peripherally adjoining pillar parts 110 for holding a rolling element (for example, a needle or a cylindrical roller) rollably.

Figure 5:
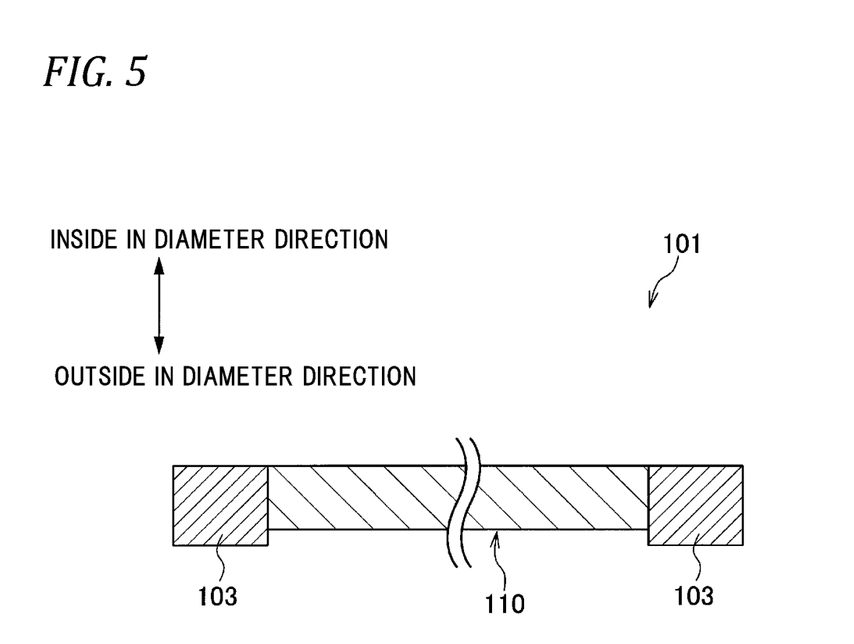
FIG. 5 is a section view of the conventional radial draw cage when viewed from the circumferential direction.

As shown in FIG. 5, in the radial draw cage 101, the outside diameter of the rim part 103 is larger than the outside diameter of the pillar part 110 and the radial thickness of the rim part 103 is larger than the radial thickness of the pillar part 110.

Figure 6:
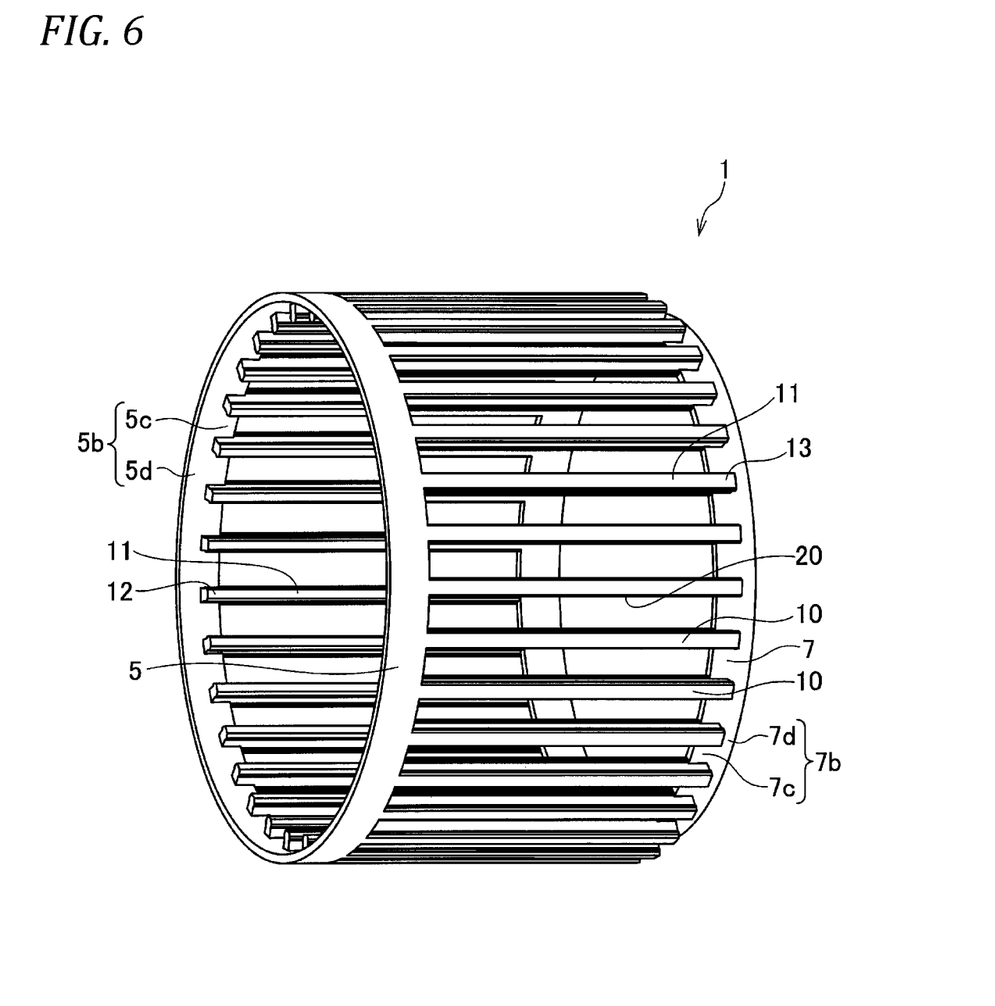
FIG. 6 is a perspective view of a conventional axial draw cage when viewed from one side in the axial direction.
Figure 7:
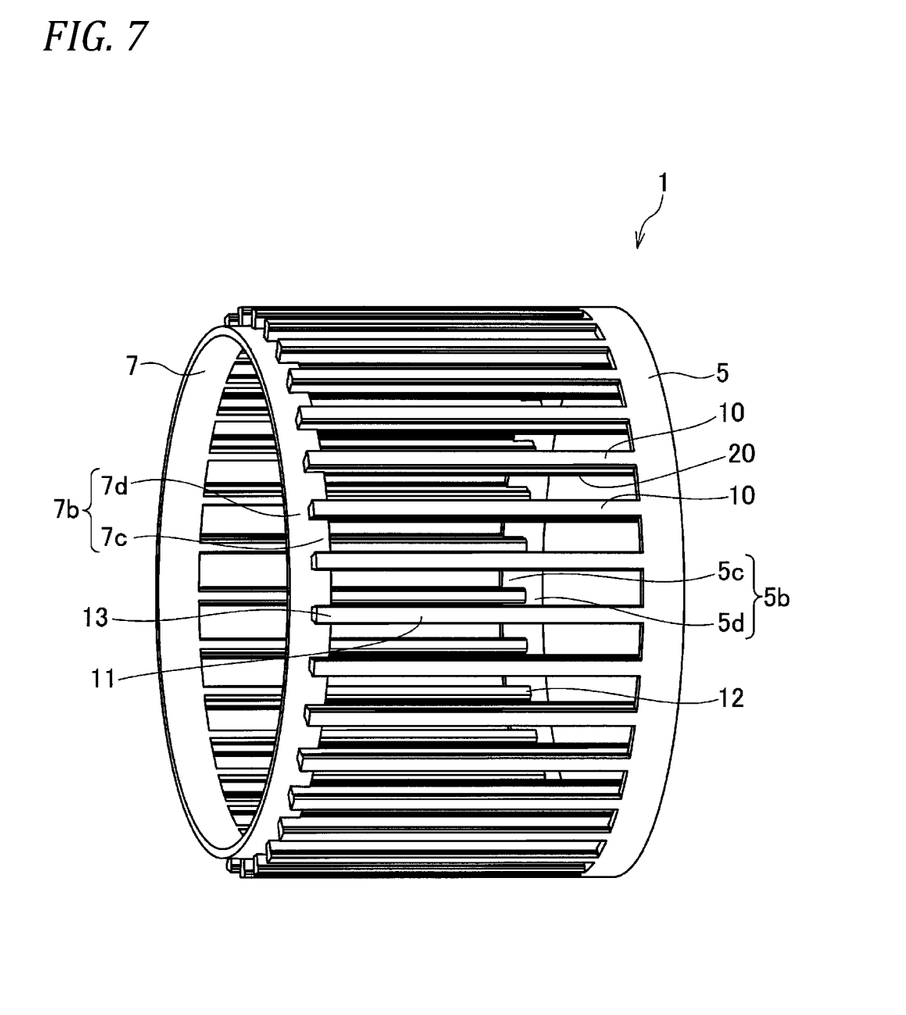
FIG. 7 is a perspective view of the conventional axial draw cage when viewed from the other side in the axial direction.

Meanwhile, as shown in FIGS. 6 and 7, a cage 1 molded according to an axial draw system includes: annular large-diameter rim part 5 and small-diameter rim part 7 spaced axially from each other and arranged coaxially; multiple pillar parts 10 connecting together the large-diameter rim part 5 and small-diameter rim part 7 in the axial direction and arranged at specific intervals in the circumferential direction; and, pocket parts 20 each defined by the large-diameter rim part 5 and small-diameter rim part 7 and peripherally adjoining pillar parts 10 for holding a rolling element (for example, a needle or a cylindrical roller) rollably.

Figure 8:
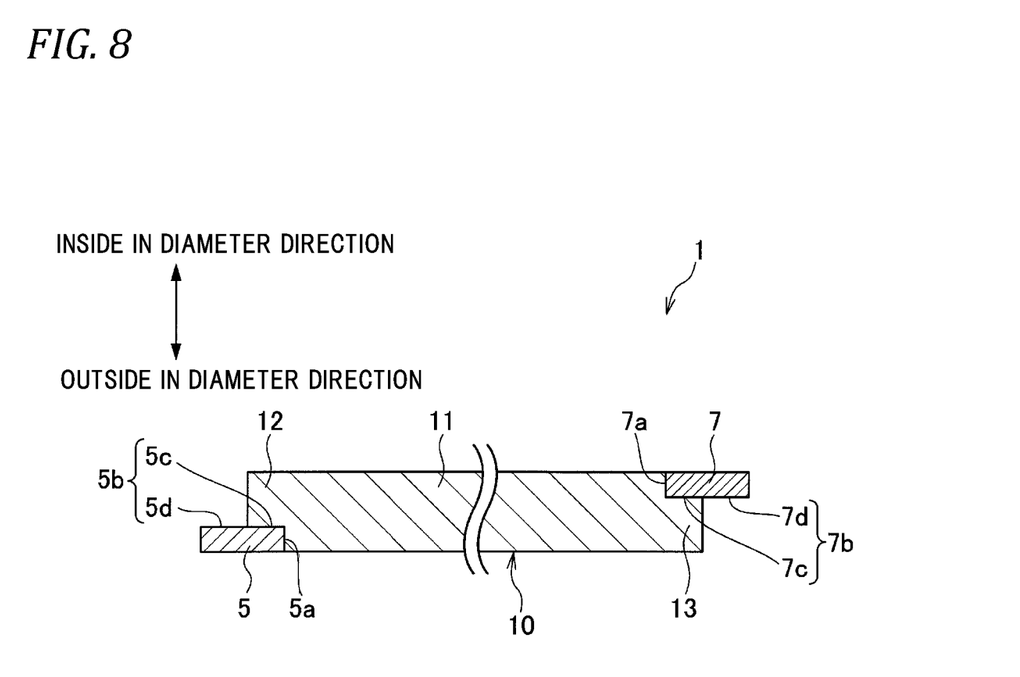
FIG. 8 is a perspective view of the conventional axial draw cage when viewed from the circumferential direction.

As shown in FIG. 8, each pillar part 10 includes an extension portion 11 extending axially between the large-diameter rim part 5 and small-diameter rim part 7, an inside projecting portion 12 projecting from the radial inside of the extension portion 11 toward the large-diameter rim part 5 (outward in the axial direction), and an outside projecting portion 13 projecting from the radial outside of the extension portion 11 toward the small-diameter rim part 7 (outward in the axial direction).

The extension portion 11 is connected to the axial-direction inside surface 5a of the large-diameter rim part 5 and the axial-direction inside surface 7a of the small-diameter rim part 7. The inside projecting portion 12 is connected to the inner peripheral surface 5b of the large-diameter rim part 5. The outside projecting portion 13 is connected to the outer peripheral surface 7b of the small-diameter rim part 7. And, the inner peripheral surface 5b of the large-diameter rim part 5 includes an axial-direction inside portion 5c axially overlapping with the inside projecting portion 12 and an axial-direction outside portion 5d not axially overlapping with the inside projecting portion 12. Also, the outer peripheral surface 7b of the small-diameter rim part 7 includes an axial-direction inside portion 7c axially overlapping with the outside projecting portion 13 and an axial-direction outside portion 7d not axially overlapping with the outside projecting portion 13.

RELATED ART REFERENCE

Patent Document

Patent document 1: JP-A-2005-225032
Patent document 2: J-UM-A-S62-117322
Patent document 3: JP-A-S60-8525
Patent document 4: JP-A-H02-89814

SUMMARY OF THE INVENTION

Problems to be Solved by the Invention

Here, the axial draw cage 1 can reduce greatly the number of parts of a mold when compared with the radial draw cage 101 and thus is advantageous in lead time and cost. However, in structure, since the mold is removed in the axial direction after molded, the shape of the axial draw cage 1 is asymmetrical. Also, the radial thickness of the large-diameter rim part 5 and small-diameter rim part 7 is smaller than the radial thickness of the paired rim parts 103 of the radial draw cage 101. This reduces the rigidity of the axial draw cage 1, thereby raising a fear that the cage 1 can be deformed and the rolling elements can be removed due to such deformation. Also, in order to enhance the rigidity, the axial-direction thickness of the large-diameter rim part 5 and small-diameter rim part 7 may be increased, or the number of rolling elements may be reduced to thereby increase the peripheral-direction width of the pillar part 10. However, in this case, the bearing rating capacity is reduced when compared with the radial draw cage 101.

The invention is made in view of the above circumstances and thus has an object to provide a plastic cage having good rigidity.

Means for Solving the Problems

The above object of the invention is attained by the following structure.

(1) A radial bearing plastic cage injection molded by an axial draw mold, includes:

annular large-diameter and small-diameter rim parts, axially spaced and coaxially arranged; and multiple pillar parts connecting together the large-diameter and small-diameter rim parts in the axial direction and arranged at regular intervals in the circumferential direction, wherein:

the pillar parts are connected to the inner peripheral surface of the large-diameter rim part and to the outer peripheral surface of the small-diameter rim part;

the inner peripheral surface of the large-diameter rim part and the outer peripheral surface of the small-diameter rim part respectively have an axial-direction inside portion overlapping with the pillar parts in the axial direction and an axial-direction outside portion not overlapping with the pillar parts in the axial direction;

a small-diameter annular member is internally fitted in the axial-direction outside portion of the inner peripheral surface of the large-diameter rim part; and a large-diameter annular member is externally fitted on the axial-direction outside portion of the outer peripheral surface of the small-diameter rim part.

(2) A plastic cage injection molded by an axial draw mold, includes:

annular large-diameter and small-diameter rim parts, axially spaced and coaxially arranged; and multiple pillar parts connecting together the large-diameter and small-diameter rim parts in the axial direction and arranged at regular intervals in the circumferential direction, wherein:

the pillar parts are connected to the inner peripheral surface of the large-diameter rim part and to the outer peripheral surface of the small-diameter rim part;

the inner peripheral surface of the large-diameter rim part has an axial-direction inside portion overlapping with the pillar parts in the axial direction and an axial-direction outside portion not overlapping with the pillar parts in the axial direction; and a small-diameter annular member is internally fitted in the axial-direction outside portion of the inner peripheral surface of the large-diameter rim part.

(3) A radial bearing plastic cage injection molded by an axial draw mold, includes:

annular large-diameter and small-diameter rim parts, axially spaced and coaxially arranged; and multiple pillar parts connecting together the large-diameter and small-diameter rim parts in the axial direction and arranged at regular intervals in the circumferential direction, wherein:

the pillar parts are connected to the inner peripheral surface of the large-diameter rim part and to the outer peripheral surface of the small-diameter rim part;

the outer peripheral surface of the small-diameter rim part has an axial-direction inside portion overlapping with the pillar parts in the axial direction and an axial-direction outside portion not overlapping with the pillar parts in the axial direction; and a large-diameter annular member is externally fitted on the axial-direction outside portion of the outer peripheral surface of the small-diameter rim part.

Advantage of the Invention

According to a plastic cage of the invention, the small-diameter annular member is internally fitted in the axial-direction outside portion of the inner peripheral surface of the large-diameter rim part, and the large-diameter annular member is externally fitted on the axial-direction outside portion of the outer peripheral surface of the small-diameter rim part. Therefore, without changing the shape of the cage, the rigidity of the cage can be enhanced.

MODES FOR CARRYING OUT THE INVENTION

Now, description is given below of a plastic cage according to an embodiment of the invention with reference to the drawings. Here, the plastic cage of the embodiment is the same in the basic structure as the conventional axial draw cage shown in FIGS. 6~8 and thus description is given specifically only of different parts thereof, while the same or equivalent parts are given the same designations and the description thereof is omitted.

Figure 1:
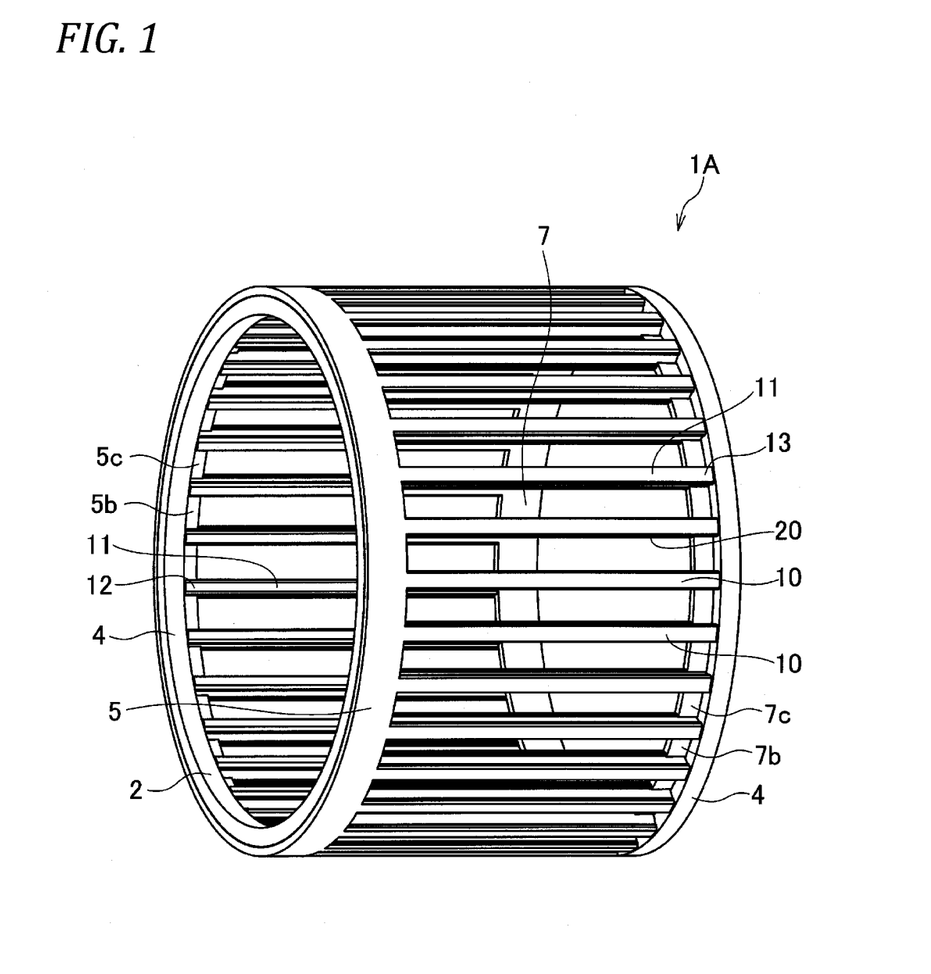
FIG. 1 is a perspective view of a plastic cage according to the embodiment when viewed from one side in the axial direction.
Figure 2:
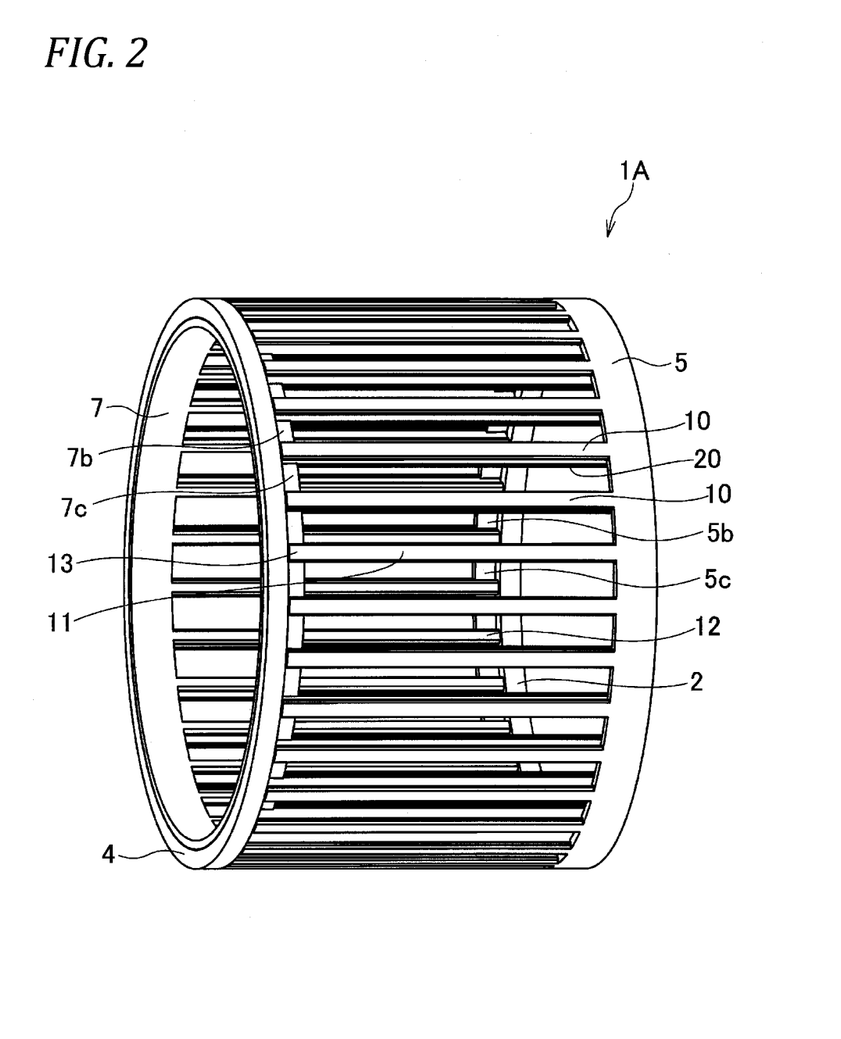
FIG. 2 is a perspective view of the plastic cage according to the embodiment when viewed from the other side in the axial direction.
Figure 3:
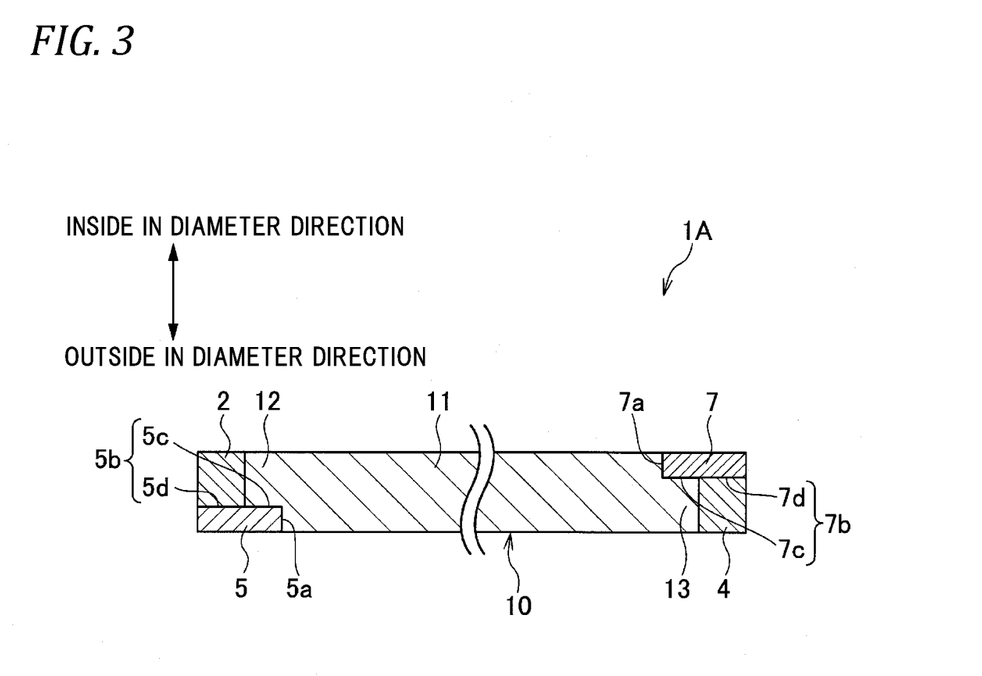
FIG. 3 is a section view of the plastic cage according to the embodiment when viewed from the circumferential direction.

As shown in FIGS. 1~3, in the plastic cage 1A of the embodiment, a small-diameter annular member 2 is internally fitted in the axial-direction outside portion 5d of the inner peripheral surface 5b of a large-diameter rim part 5 with interference. Also, a large-diameter annular member 4 is externally fitted on the axial-direction outside portion 7d of the outer peripheral surface 7b of a small-diameter rim part 7 with interference. Such provision of the small-diameter annular member 2 and large-diameter annular member 4 enables enhancement in the rigidity of the plastic cage 1A.

The axial-direction width of the small-diameter annular member 2 is substantially the same as the axial-direction width of the inner peripheral surface 5b of the large-diameter rim part 5, and the inside diameter thereof is substantially the same as the inside diameter of the pillar part 10. The axial-direction width of the large-diameter annular member 4 is substantially the same as the axial-direction outside portion 7d of the outer peripheral surface 7b of the small-diameter rim part 7, and the outside diameter thereof is substantially the same as the outside diameter of the pillar part 10.

Here, the inside diameter of the small-diameter annular member 2 may be equal to or smaller than at least the inside diameter of the pillar 10, and the outside diameter of the large-diameter annular member 4 may be equal to or larger than at least the inside diameter of the pillar 10. In this case, when the plastic cage 1A of the invention is applied to a radial bearing of a cage guide type, the plastic cage 1A can be prevented from being guided by the inner or outer peripheral surfaces of the multiple pillar parts 10 which are discontinuous surfaces. That is, since the plastic cage 1A can be guided by the inner peripheral surface of the small-diameter annular member 2 or by the outer peripheral surface of the large-diameter annular member 4, which is a continuous surface, stable rotation can be secured.

The material of the small-diameter annular member 2 and large-diameter annular member 4 may be the same plastic material as the plastic cage 1A or may be a metal member such as a steel plate.

In the case that the same plastic material as the plastic cage 1A is used in the small-diameter annular member 2 and large-diameter annular member 4, when the small-diameter annular member 2 and large-diameter annular member 4 are fitted in the plastic cage 1A with interference, expansion amount and contraction amount due to temperature changes are substantially the same, thereby enabling prevention of the small-diameter annular member 2 and large-diameter annular member 4 against removal. Here, as the plastic material, there can be used 66 nylon, 46 nylon, polyphenylene sulfide (PPS) and so on.

In the case that metal material is used in the small-diameter annular member 2 and large-diameter annular member 4, the rigidity of the plastic cage 1A can be enhanced further. Here, as the metal material, there can be used a cold rolled steel sheet (SPC member), a high carbon chromium bearing steel (SUJ2) and so on. When the cold rolled steel sheet is used, press working is possible, thereby enabling provision of desired small-diameter annular member 2 and large-diameter annular member 4 can be provided at low costs.

Here, the invention is not limited to the above-mentioned embodiment and the modifications thereof but it can be changed and improved properly.

For example, in the above embodiment, the small-diameter annular member 2 is internally fitted in the axial-direction outside portion 5d of the inner peripheral surface 5b of the large-diameter rim part 5, and the large-diameter annular member 4 is externally fitted on the axial-direction outside portion 7d of the outer peripheral surface 7b of the small-diameter rim part 7. However, this structure is not limitative but only one of the small-diameter annular member 2 and large-diameter annular member 4 may also be fitted in the plastic cage 1A. In this structure, when the large-diameter rim part 5 and small-diameter rim part 7 are different in the radial thickness from each other, only the short-rigidity side can be strengthened. Also, in this case, the small-diameter annular member 2 or large-diameter annular member 4 can be used to distinguish the assembling direction of the plastic cage 1A in the axial direction. Here, when the color of the plastic cage 1A is different from that of the small-diameter annular member 2 or large-diameter annular member 4, more positive distinction is possible.

The application is based on the Japanese Patent Application No. 2013-252508 filed on Dec. 5, 2013 and thus the contents thereof are incorporated herein for reference.

DESCRIPTION OF REFERENCE NUMERALS AND SIGNS

1: Plastic cage
2: Small-diameter annular member
4: Large-diameter annular member
5: Large-diameter rim part
5a: Axial-direction inside surface
5b: Inner peripheral surface
5c: Axial-direction inside portion
5d: Axial-direction outside portion
7: Small-diameter rim part
7a: Axial-direction inside surface
7b: Outer peripheral surface
7c: Axial-direction inside portion
7d: Axial-direction outside portion
10: Pillar part
11: Extension portion
12: Inside projecting portion
13: Outside projecting portion
20: Pocket part

The invention claimed is:

1. A radial bearing plastic cage injection molded by an axial draw mold, comprising:
annular large-diameter and small-diameter rim parts, axially spaced and coaxially arranged; and
multiple pillar parts connecting together the large-diameter and small-diameter rim parts in the axial direction and arranged at regular intervals in the circumferential direction, wherein:
the pillar parts are connected to the inner peripheral surface of the large-diameter rim part and to the outer peripheral surface of the small-diameter rim part;
the inner peripheral surface of the large-diameter rim part and the outer peripheral surface of the small-diameter rim part respectively have an axial-direction inside portion overlapping with the pillar parts in the axial direction and an axial-direction outside portion not overlapping with the pillar parts in the axial direction;
a small-diameter annular member is internally fitted in the axial-direction outside portion of the inner peripheral surface of the large-diameter rim part; and
a large-diameter annular member is externally fitted on the axial-direction outside portion of the outer peripheral surface of the small-diameter rim part.

2. A plastic cage injection molded by an axial draw mold, comprising:
annular large-diameter and small-diameter rim parts, axially spaced and coaxially arranged; and
multiple pillar parts connecting together the large-diameter and small-diameter rim parts in the axial direction and arranged at regular intervals in the circumferential direction, wherein:
the pillar parts are connected to the inner peripheral surface of the large-diameter rim part and to the outer peripheral surface of the small-diameter rim part;
the inner peripheral surface of the large-diameter rim part has an axial-direction inside portion overlapping with the pillar parts in the axial direction and an axial-direction outside portion not overlapping with the pillar parts in the axial direction; and
a small-diameter annular member is internally fitted in the axial-direction outside portion of the inner peripheral surface of the large-diameter rim part.

3. A radial bearing plastic cage injection molded by an axial draw mold, comprising:
annular large-diameter and small-diameter rim parts, axially spaced and coaxially arranged; and
multiple pillar parts connecting together the large-diameter and small-diameter rim parts in the axial direction and arranged at regular intervals in the circumferential direction, wherein:
the pillar parts are connected to the inner peripheral surface of the large-diameter rim part and to the outer peripheral surface of the small-diameter rim part;
the outer peripheral surface of the small-diameter rim part has an axial-direction inside portion overlapping with the pillar parts in the axial direction and an axial-direction outside portion not overlapping with the pillar parts in the axial direction; and
a large-diameter annular member is externally fitted on the axial-direction outside portion of the outer peripheral surface of the small-diameter rim part.

\* \* \* \* \*